Jan. 30, 1968  J. C. BOYER, JR  3,366,291

HAT MAKING METHOD

Filed Sept. 2, 1965

INVENTOR.
JOHN C. BOYER, JR.
BY
Joseph A. Brown
ATTORNEY

United States Patent Office 3,366,291
Patented Jan. 30, 1968

3,366,291
HAT MAKING METHOD
John C. Boyer, Jr., Reading, Pa., assignor to Geo. W. Bollman & Co., Inc., Adamstown, Pa., a corporation of Pennsylvania
Filed Sept. 2, 1965, Ser. No. 484,664
4 Claims. (Cl. 223—7)

ABSTRACT OF THE DISCLOSURE

A method of making a wrinkle free hat comprising placing plural layers of woven, knitted, or like fabric against each other and connected by an adhesive to form a workpiece and then formed into desired shape by directing a transverse force to the workpiece while holding it tight enough to prevent fabric override and loose enough to allow slippage.

---

This invention relates generally to improvements in the manufacture of molded hats and more particularly to a method used in making such hats.

In the usual method of manufacturing molded hats, materials comprising all or a large percentage of synthetic heat activatable fibers are molded in machines designed to ttake advantage of their thermoplasticity.

One object of the present invention is to provide an improved method for manufacturing wrinkle free molded hats from flat fabrics.

Another object of this invention is to mold said fabrics by allowing slippage of the material parallel and perpendicular to the direction of pull during the molding operation, whereby a wide variety of materials may be used.

A further object of this invention is to provide a method of molding hats from woven, knitted, non-woven, or plastic fabrics made from any type of natural and/or synthetic fibers.

Other objects and advantages of our invention will be apparent hereinafter from the specification and from the recital in the appended claims.

In principle, it has been found that fabrics whether they be woven, knitted, non-woven, or plastic can, with the aid of a special molding machine and drawing technique, be satisfactorily molded wrinkle free into a hat shape. This is also true regardless of the composition of the fabrics used since moldability depends upon the amount and direction of slippage in the molding machine rather than upon their thermoplasticity.

One possible method of manufacture of molded fabric hats which utilizes the above principle involves woven fabrics. This includes the following basic steps:

(1) Choosing the materials.
(2) Cuttng and preparing the materials.
(3) Drawing the materials.
(4) Joining the brim and crown.

CHOOSING THE MATERIALS

Figure 1:
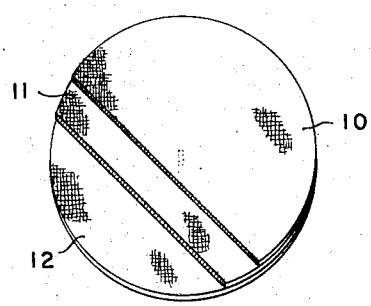
FIG. 1 is a perspective view of an assembled disc of woven fabrics, layer on layer, which will be molded to form the crown of the hat, the top two layers being broken away for better illustration.

The three layers used in this particular method comprise the face fabric 10, the crown innerlayer 11, and the backing 12 as illustrated by FIG. 1. The face fabric 10, which is usually the only visible fabric on the completed hat, is chosen for its color, pattern, appeal and the like. The inner or middle layer 11, if used, should add stiffness and stability to the crown of the hat and should be chosen accordingly. Examples of this type of fabric are burlap, buckram, and nylon mesh. The backing 12, if used, will become the lining of the hat and should also be chosen accordingly. In the particular method to be described, three layers are used.

When more than one layer of fabric is used, it is desirable, but not essential, for all layers to be composed of the same type of fabrics, such as all woven, or all knitted. If, for instance, a woven and knitted fabric are laminated together, it becomes more difficult to control the over-riding of fibers during the molding operation and could possibly result in wrinkling of the hat.

Figure 2:
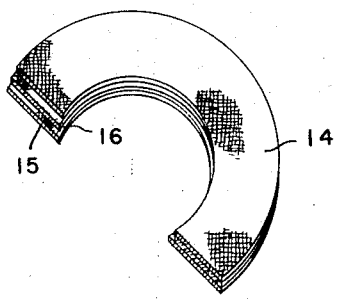
FIG. 2 is a perspective section of the assembled fabrics which will form the brim of the hat.

The brim also comprises three layers of fabric as illustrated by FIG. 2. Two layers of face fabric 14 and 15 are placed one on each side of the brim innerlayer 16. The innerlayer can consist of a woven, knitted, non-woven, or plastic material but should be such that it adds stiffness and pliability to the brim of the hat. For example, a non-woven, a cork-like material, or a fabric may be used.

If it is desirable to mold the hat in one piece, then the brim portion is omitted and the crown innerlayer 11. FIG. 1, becomes the brim innerlayer. It should also be noted that in a one piece hat, the backing will be the same as the underbrim and unless a two tone brim is desired, should be the same as the face fabric.

CUTTING AND PREPARING THE MATERIALS

The fabrics used for the crown are cut into discs of varying sizes depending on the size hat to be made and whether or not the crown and brim will be separate.

The crown innerlayer 11 is coated on both sides with an adhesive and placed between the backing and face fabric as shown in FIG. 1. If only two layers are used, then the layer representing the backing or innerlayer is coated on only one side with adhesive and this side placed against the face fabric. If only one layer is used, then it must be impregnated with a resin in order to hold it in the molded shape.

The brim section, if a two piece crown and brim are used, is also prepared at this time. The face fabrics 14 and 15 and innerlayer 16 are cut into doughnut shapes as shown in FIG. 2. The innerlayer is coated on both sides by an adhesive and sandwiched between the face fabrics. If only two layers are desired, then adhesive is applied to only one side of one of the fabrics. The brim is now ready for joining to the crown and is set aside until needed.

MOLDING THE HAT

Figures 3, 4:
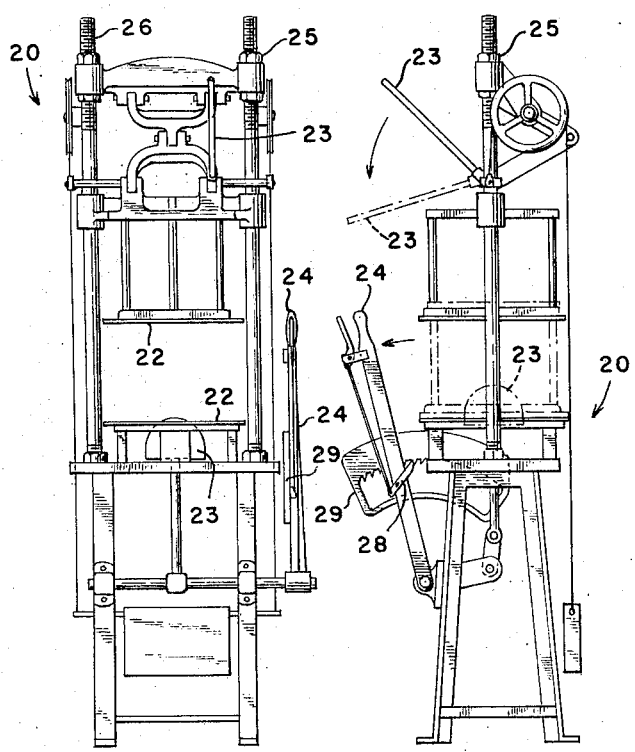
FIG. 3 is a front elevation of the special machine for molding the fabrics.
FIG. 4 is a side view of the machine shown in FIG. 3.
Figure 5:
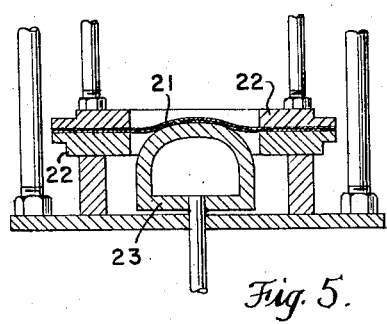
FIG. 5 is an enlarged transverse sectional view of the die members of the machine showing the fabric clamped in a position prior to molding.
Figure 6:
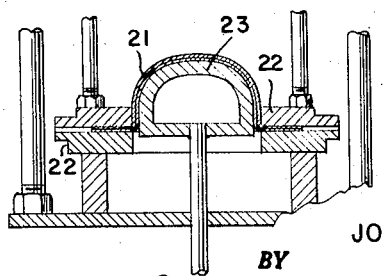
FIG. 6 is a view similar to FIG. 5 with the plug raised to mold the crown of the hat.

The previously prepared disc, whether comprising one or more layers, is transferred to the special molding machine 20 illustrated in FIGS. 3–6. The machine is preheated to a specified temperature. Molding is accomplished by holding material 21 (FIG. 5) horizontally between clamping plates 22 and pushing a plug 23 upwardly into the center of the material by means of handle 24 (FIG. 3). It is important to note that plates 22 must clamp the material discs tight enough to prevent overriding of fibers, causing wrinkling of material, yet loose enough to allow slippage in the direction of pull and perpendicular to the direction of pull. The tension on the plates is regulated by handle 23 and by adjusting the two nuts 25 at the top of machine shafts 26. The depth of draw, as seen by comparing FIG. 6 with FIG. 5, is regulated by handle 23 and held constant at the desired position by engaging pawl 28 on the handle with one of the teeth of ratchet 29.

This method of molding is basically the same for any type of fabric. However, the amount and direction of slippage changes somewhat when knitted and non-woven fabrics are used.

The hat workpiece 21 is allowed to remain in the machine until the adhesive and/or resins have hardened sufficiently to enable the materials to retain their molded shape. It is then taken from the molding machine and transferred to a conventional hat press and pressed to its final shape. This is done whether it is a two piece or one piece hat.

Figure 7:
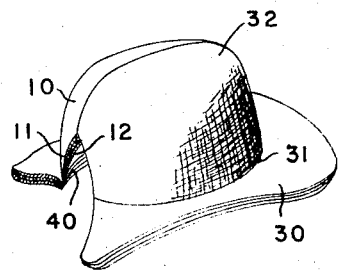
FIG. 7 shows the molded crown of the hat after it has been shaped and before excess material has been removed, part of the crown being broken away for illustration of the layers forming the crown.

After shaping, the hat, in the case of the one piece crown and brim, is removed from press, rounded, and trimmed. In the case of the two piece hat, the crown is removed from the press and the excess material removed. FIG. 7 illustrates the pressed crown prior to removal of the excess material. Numeral 30 represents the excess crown material and numeral 31 shows the point at which the excess material is removed. The shaped and molded crown, is indicated at 32 in FIGS. 7 and 10, 11 and 12 show the face fabric, innerlayer, and backing (lining) respectively. The crown is now ready for joining to the brim.

If a male plug of the desired shape and a corresponding female mold are used in the molding machines in FIGS. 3-6, the final shape can be put into the hat during the molding operation and further pressing eliminated.

JOINING BRIM AND CROWN

Adhesive is applied to the inside of the crown at 40 (FIG. 7), starting at the base of the crown and up the side approximately one inch. The crown is then returned to the hat press and the brim section prepared previously is placed on top and properly centered. The pressing plug is inserted, and then the press closed. The plug forces the excess material from the doughnut inside the crown and against the adhesive causing it to fuse against the crown wall. The hat is then removed, rounded, and trimmed.

Figure 8:
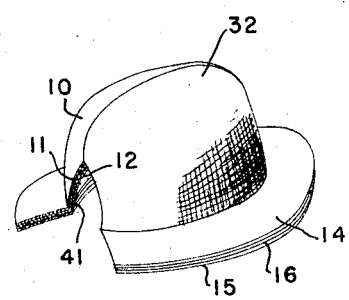
FIG. 8 shows the hat after the crown and brim have been joined.

FIG. 8 illustrates the completed hat after the crown and brim have been joined. Numeral 41 represents the material which has been pushed inside the crown and fused to the inside wall.

To show the manner in which the invention may be practiced, the following examples are provided:

Example I

A woven face fabric consisting of 100% wool fiber is cut into a disc measuring sixteen inches in diameter. A woven seven oz. burlap material and a woven cotton chintz backing are cut sixteen inches in diameter. The brim sections are also cut from the face fabric with the bottom layer measuring ten by twelve inches outside dimensions and six by seven and one half inches for the inside dimension and the top section measuring ten by twelve inches outside and five by seven inches inside. The brim innerlayer is cut the same as the bottom layer from Corktex made by Armstrong.

The burlap and Corktex are surface coated on both sides by an acrylic latex adhesive, made for example by Rohm & Haas Co., to a pickup of 40% of the dry weight for the burlap and 30% of the dry weight for the Corktex.

The cut lining (backing) is placed on one side of the burlap and the face fabric on the other side and the resulting sandwich is transferred to the molding machine while the adhesive is still wet. A section of face fabric is placed on both sides of an innerlayer of Corktex and set aside to dry.

The prepared crown is then molded on the machine in FIGS. 3–6 pre-heated to 275° F. The crown is allowed to dry for two minutes and removed. It is then taken to a hat pressing machine which is pre-heated to 250° F. Air pressure (100 lbs. gauge) is applied after the press is closed and the crown is pressed for forty-five seconds. It is then removed and the excess material below the crown removed.

The crown is then coated from the base one inch up the inside with an acrylic thermosetting adhesive, made for example by Standard Chemical Co.; and then the crown is returned to the press while the resin is still wet. The brim section is centered on top of the crown with one section down so as to become the top of the brim and the other section up so as to become the bottom of the brim. The plug is again inserted and the press closed. Air pressure (100 lbs. gauge) is applied and the hat pressed for thirty seconds at 250° F. The hat is then removed and trimmed.

Example II

Two knitted face fabrics consisting of 95% paper and 5% polypropylene are cut into discs measuring twenty two inches in diameter. The fabrics are coated on one side each with an acrylic latex adhesive and laminated together while the resin is still wet.

The resulting disc is then transferred to the molding machine which had been pre-heated to 250° F. and molded to shape. Molding is accomplished by allowing the fabric to slip between the holding plates of the machine according to the method previously described. The resultant hat is allowed to remain in the machine for three minutes to allow the resin to solidify. It is then removed and transferred to a conventional hat pressing machine where it is pressed to the desired final shape.

The resulting hat consists of a one piece crown and brim possessing good stiffness and shape retention.

Example III

Two knitted fabrics consisting of a nylon backing and a cotton face fabric are cut into discs twenty inches in diameter. A sheet of ten mil polyurethane is placed between them and the resulting sandwich heated flat between two electrically heated plates at 325° F. for sixty seconds.

It is then removed and quickly placed in the molding machine and molded into shape. The machine in this instance is pre-heated to 125° F. The material must be transferred to the machine before any substantial cooling has occurred or the polyurethane will no longer be in a molten state. The time involved from the electrically heated plates to the completed molding operation should not be longer than fifteen seconds. The hat is kept in the machine for sixty seconds, removed, pressed to a final shape, rounded, and trimmed.

The advantages of the described process may be readily apparent. The molding machine may be used to make a hat of any desired shape or size, these characteristics being dependent on the mold used to form the hat.

Another advantage is that by choosing different types of adhesives and/or resins in the molding operation, desirable properties such as porosity, crushability, shape retention, and water repellency can be incorporated.

While this invention has been described in connection with several examples of the basic method, it will be understood that it is capable of modification, and this application is intended to cover any variations, uses, or adaptations following, in general, the principles of the invention and including such departures from the present disclosure as come within known or customary practice

Having thus described my invention, what I claim is:

1. The method of making a wrinkle-free hat comprising forming a crown workpiece by placing a plural number of fabric layers one on top of the other after coating the surfaces of adjacent layers with an adhesive to connect them into a unitary crown workpiece, then forming a brim workpiece by placing face fabrics on opposite sides of an innerlayer coated on both sides by an adhesive, and all three layers being doughnut shaped, then yieldably holding the crown workpiece adjacent the outer portions thereof and forming it into desired shape by directing against it a pre-heated die element, the hold on the workpiece being tight enough to prevent over-riding of the fabric fibers and loose enough to allow slippage in the direction of pull and perpendicular thereto, then allowing the crown workpiece to cool so that it will hold its formed shape, then trimming from the crown workpiece any excess material, then applying adhesive to the inside of the crown workpiece along the base thereof, and then joining the brim to the crown by forcing an edge of the brim workpiece into the crown and against the adhesive thereon by a heated die element in a closed press.

2. The method recited in claim 1 wherein said workpiece comprises three layers, one a woven face fabric, one chintz and a layer of burlap, cork or the like between them.

3. The method recited in claim 2 wherein the adhesive by which said layers are connected is an acrylic latex adhesive applied to a pickup of about 40% dry weight for the burlap and about 30% dry weight for the cork.

4. The method recited in claim 2 wherein said die element is pre-heated in the range of 275° F. and the workpiece is allowed to remain on it for about two minutes before removal.

References Cited

UNITED STATES PATENTS

| | | | |
|---|---|---|---|
| 1,669,266 | 5/1928 | Stevens | 264—258 |
| 2,251,477 | 8/1941 | Wisman | |
| 2,415,721 | 2/1947 | Arner | 156—293 |
| 2,753,287 | 7/1956 | Thomson | 156—227 |
| 2,956,916 | 10/1960 | Voss | 264—258 |
| 3,083,734 | 4/1963 | Taplin | 264—324 |
| 3,205,110 | 9/1965 | Rinderspacher | 264—292 |
| 3,225,768 | 12/1965 | Galitzki | 264—292 |

FOREIGN PATENTS 552,434    12/1956    Italy.

ROBERT F. WHITE, *Primary Examiner.*

R. R. KUCIA, *Assistant Examiner.*